(12) United States Patent
Patil et al.

(10) Patent No.: US 9,848,454 B2
(45) Date of Patent: Dec. 19, 2017

(54) SWITCHING MODE OF OPERATION IN D2D COMMUNICATIONS

(71) Applicant: QUALCOMM Incorporated, San Diego, CA (US)

(72) Inventors: Shailesh Patil, North Wales, PA (US); Sudhir Kumar Baghel, Bridgewater, NJ (US); Peter Gaal, San Diego, CA (US); Saurabha Rangrao Tavildar, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 14/599,254

(22) Filed: Jan. 16, 2015

(65) Prior Publication Data

US 2015/0215981 A1 Jul. 30, 2015

Related U.S. Application Data

(60) Provisional application No. 61/932,729, filed on Jan. 28, 2014.

(51) Int. Cl.
*H04W 72/00* (2009.01)
*H04W 76/02* (2009.01)
(Continued)

(52) U.S. Cl.
CPC ......... *H04W 76/023* (2013.01); *H04W 72/02* (2013.01); *H04W 72/1263* (2013.01)

(58) Field of Classification Search
None
See application file for complete search history.

(56) References Cited

U.S. PATENT DOCUMENTS

| 2003/0217171 A1* | 11/2003 | Von Stuermer | G11B 27/036 709/231 |
| 2009/0163198 A1* | 6/2009 | Ray | H04M 3/42246 455/425 |

(Continued)

FOREIGN PATENT DOCUMENTS

| CN | WO 2013013412 A1 * | 1/2013 | .......... H04W 36/165 |
| SE | WO 2014077766 A1 * | 5/2014 | .......... H04W 52/245 |
| WO | WO-2013013412 A1 | 1/2013 | |

OTHER PUBLICATIONS

Ericsson, On Out of Coverage Definitions for D2D, Nov. 11-15, 2013, pp. 1-4.*

(Continued)

*Primary Examiner* — Eunsook Choi
*Assistant Examiner* — Ayanah George
(74) *Attorney, Agent, or Firm* — Holland & Hart LLP

(57) ABSTRACT

Methods, systems, and devices are described for switching a mode of operations in device to device (D2D) communications. A UE within the coverage area of a base station may communicate directly with other UEs using a centralized transmission resource schedule. Prior to experiencing radio link failure (RLF), the UE may determine that switching parameters have been met and transition to an intermediate mode based on a distributed transmission schedule using a pool of resources established by the base station. In one example, the switching parameters may be received from the base station in a connection response message. In another example, the UE may send a switching request to the base station prior to initiating the transition to the intermediate mode. In some cases, after the transition to the intermediate mode, the UE may experience a radio link failure and transition to a distributed mode using a predetermined pool of resources.

30 Claims, 13 Drawing Sheets

(51) Int. Cl.
    *H04W 72/12*     (2009.01)
    *H04W 72/02*     (2009.01)

(56) References Cited

U.S. PATENT DOCUMENTS

| | | | | |
|---|---|---|---|---|
| 2012/0093098 A1* | 4/2012 | Charbit | ............... | H04W 72/04 |
| | | | | 370/329 |
| 2012/0250551 A1* | 10/2012 | Sartori | ............... | H04W 48/12 |
| | | | | 370/252 |

OTHER PUBLICATIONS

Ericsson, "On Out of Coverage Definitions for D2D," 3GPP TSG RAN WG1 Meeting #75, San Francisco, USA, Nov. 11-15, 2013, 4 pgs., R1-135809, URL: http://www.3gpp.org/DynaReport/TDocExMtg--R1-75--30046.htm, 3rd Generation Partnership Project.

IPEA/EPO, Second Written Opinion of the International Preliminary Examining Authority, Int'l. App. No. PCT/US2015/011910, dated Dec. 4, 2015, European Patent Office, Rijswijk, NL, 5 pgs.

ISA/EPO, International Search Report and Written Opinion of the International Searching Authority, Int'l. App. No. PCT/US2015/011910, dated Apr. 17, 2015, European Patent Office, Rijswijk, NL, 9 pgs.

* cited by examiner

SWITCHING MODE OF OPERATION IN D2D COMMUNICATIONS

CROSS REFERENCES

The present Application for Patent claims priority to U.S. Provisional Patent Application No. 61/932,729 by Patil et al., entitled "Switching Mode of Operation in D2D Communications," filed Jan. 28, 2014, and assigned to the assignee hereof.

BACKGROUND

Field of the Disclosure

The following relates generally to wireless communication, and more specifically to switching a mode of operations in device to device (D2D) communications.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices or other user equipment (UE) devices. Base stations may communicate with UEs on downstream and upstream links. Each base station has a coverage range, which may be referred to as the coverage area of the cell. D2D communications involve direct wireless communications between UEs either within or beyond the coverage area of a base station. D2D communications may be facilitated by scheduling transmissions from a base station if the devices are within a coverage area.

In some cases, D2D communications are utilized by public safety officers such as police, fire and rescue teams. Public safety teams utilizing D2D communications may move in and out of a wireless network coverage area. When a UE leaves a coverage area it may transition from a mode in which communications are facilitated by a base station to a mode that is independent of a base station. In some cases, this transition may temporarily disrupt the D2D communications. A temporary disruption in the communications of a public safety team may negatively impact their ability to accomplish their mission in a timely manner.

SUMMARY

The described features generally relate to one or more improved systems, methods, or apparatuses for switching a mode of operations in device to device (D2D) communications. A UE within the coverage area of a base station may communicate directly with other UEs using a centralized transmission resource schedule from the base station. Prior to experiencing radio link failure (RLF) with the base station, the UE may determine that one or more switching parameters have been met and initiate a transition to an intermediate mode that does not depend on a centralized schedule. The intermediate mode may be based on a distributed transmission schedule using a pool of resources established by the base station. In one example, the switching parameters may be received from the base station in a connection response message. In another example, the UE may send a switching request to the base station prior to initiating the transition to the intermediate mode. In some cases, after the transition to the intermediate mode, the UE may experience a radio link failure and transition to a distributed transmission mode using a predetermined pool of resources.

In another example, a UE communicates directly with other UEs using D2D communications based on a distributed transmission schedule using preconfigured resources prior to entering the coverage area of a base station. Upon entering the coverage area, the UE may receive system information with a pool of resources for use in D2D communications. The UE may switch to an intermediate mode based on distributed transmission schedule using the pool of resources indicated by the base station. In some cases, after switching to the intermediate mode, the UE may establish a connected state with the base station. After establishing the connected state, the UE may switch to a D2D communications mode based on a centralized transmission resource schedule.

A method of device to device (D2D) wireless communication at a user equipment (UE) is described, comprising establishing communications with one or more other UEs according to a first D2D mode, the first D2D mode based at least in part on a centralized transmission resource schedule received from a base station; determining that one or more mode switching parameters have been satisfied; and switching to a second D2D mode, the second D2D mode based at least in part on a distributed transmission scheduling using a pool of resources allocated by the base station.

An apparatus for device to device (D2D) wireless communication at a user equipment (UE) is also described, comprising: means for establishing communications with one or more other UEs according to a first D2D mode, the first D2D mode based at least in part on a centralized transmission resource schedule received from a base station; means for determining that one or more mode switching parameters have been satisfied; and means for switching to a second D2D mode, the second D2D mode based at least in part on a distributed transmission scheduling using a pool of resources allocated by the base station.

An apparatus for device to device (D2D) wireless communication at a user equipment (UE) is also described, comprising: a processor; memory in electronic communication with the processor; and instructions stored in the memory, the instructions being executable by the processor to: establish communications with one or more other UEs according to a first D2D mode, the first D2D mode based at least in part on a centralized transmission resource schedule received from a base station; determine that one or more mode switching parameters have been satisfied; and switch to a second D2D mode, the second D2D mode based at least in part on a distributed transmission scheduling using a pool of resources allocated by the base station.

A computer program product for device to device (D2D) wireless communication at a user equipment (UE) is also described, the computer program product comprising a non-transitory computer-readable medium storing instructions executable by a processor to: establish communications with one or more other UEs according to a first D2D mode, the first D2D mode based at least in part on a centralized transmission resource schedule received from a base station; determine that one or more mode switching parameters have been satisfied; and switch to a second D2D mode, the second D2D mode based at least in part on a distributed transmission scheduling using a pool of resources allocated by the base station.

Some examples of the method, apparatuses, or computer program product described above may further comprise monitoring communications from the base station for an indication of the pool of resources; determining that a message from the base station indicating the pool of resources is not receivable; and switching to a third D2D mode, the third D2D mode based at least in part on distributed transmission utilizing a preconfigured resource pool.

Some examples of the method, apparatuses, or computer program product described above may further comprise sending a connection setup request to the base station, the connection setup request comprising a D2D mode indication; and receiving a connection response message from the base station comprising the one or more mode switching parameters. Some examples of the method, apparatuses, or computer program product described above may further comprise receiving one or more mode switching parameters via a broadcasted system information block (SIB) message.

In some examples of the method, apparatuses, or computer program product described above the one or more mode switching parameters comprise at least one of an out of sync indication related to a number of bad frames, an in sync indication related to a number of good frames, a time period, a path loss threshold and signal to noise (SINR) ratio threshold.

In some examples of the method, apparatuses, or computer program product described above the one or more mode switching parameters comprise at least one of a threshold number of random access channel (RACH) requests, a time period following and unsuccessful RACH attempt, a time period following a status report (SR) a buffer status report (BSR) or a resource request, or an indication of a handover failure or an incomplete handover. In some examples of the method, apparatuses, or computer program product described above the one or more mode switching parameters are received from a system information broadcast.

In some examples of the method, apparatuses, or computer program product described above the one or more mode switching parameters comprise a time period and at least one additional mode switching parameter; and determining that the one or more mode switching parameters have been satisfied comprises determining that the at least one additional mode switching parameter has been satisfied and waiting until the time period has elapsed before switching to a second D2D mode.

Some examples of the method, apparatuses, or computer program product described above may further comprise sending a mode switching request to the base station. In some examples of the method, apparatuses, or computer program product described above the one or more mode switching parameters comprise an indication from a user application and the mode switching request comprises a user initiated mode switch indication.

Some examples of the method, apparatuses, or computer program product described above may further comprise receiving a response from the base station indicating that a mode switch is allowed. In some examples of the method, apparatuses, or computer program product described above the switching to a second D2D mode is performed autonomously prior to receiving a response from the base station.

In some examples of the method, apparatuses, or computer program product described above the one or more mode switching parameters comprise a modified radio link failure (RLF) threshold. In some examples of the method, apparatuses, or computer program product described above the modified RLF threshold is configured to be satisfied prior to reaching an unmodified RLF threshold.

Some examples of the method, apparatuses, or computer program product described above may further comprise storing a mode switch information log comprising one or more of a time stamp, a UE location, a radio interface condition, a UE velocity, a cell ID, and a carrier frequency. Some examples of the method, apparatuses, or computer program product described above may further comprise maintaining a media access control (MAC) or a radio link control (RLC) configuration after switching to the second D2D mode.

Some examples of the method, apparatuses, or computer program product described above may further comprise reconfiguring a media access control (MAC) or a radio link control (RLC) configuration according to a predetermined state after switching to the second D2D mode. Some examples of the method, apparatuses, or computer program product described above may further comprise continuing communications based on distributed transmission scheduling until one or more hysteresis parameters are met.

In some examples of the method, apparatuses, or computer program product described above the one or more hysteresis parameters include at least one of a time period, a path loss parameter, a number of good frames, and a signal to noise ratio (SINR).

Some examples of the method, apparatuses, or computer program product described above may further comprise resetting a protocol layer configuration based at least in part on the switching.

Some examples of the method, apparatuses, or computer program product described above may further comprise utilizing the pool of resources associated with the second D2D mode until a connection is established with the base station; and establishing the connection with the base station. Some examples of the method, apparatuses, or computer program product described above may further comprise switching to the first D2D mode, the first D2D mode based at least in part on the centralized transmission resource schedule received from the base station.

A method of device to device (D2D) wireless communication is also described, comprising: establishing communications with one or more other UEs according to a first D2D mode, the first D2D mode based at least in part on a preconfigured pool of transmission resources; receiving system information from a base station allocating a pool of resources for transmission; and switching to a second D2D mode, the second D2D mode being based on distributed transmission scheduling using the pool of resources allocated by the base station.

An apparatus for device to device (D2D) wireless communication is also described, comprising: means for establishing communications with one or more other UEs according to a first D2D mode, the first D2D mode based at least in part on a preconfigured pool of transmission resources; means for receiving system information from a base station allocating a pool of resources for transmission; and means for switching to a second D2D mode, the second D2D mode being based on distributed transmission scheduling using the pool of resources allocated by the base station.

An apparatus for device to device (D2D) wireless communication is also described, comprising: a processor; memory in electronic communication with the processor; and instructions stored in the memory, the instructions being executable by the processor to: establishing communications with one or more other UEs according to a first D2D mode, the first D2D mode based at least in part on a preconfigured pool of transmission resources; receiving system information from a base station allocating a pool of resources for transmission; and switching to a second D2D mode, the second D2D mode being based on distributed transmission scheduling using the pool of resources allocated by the base station.

A computer program product for device to device (D2D) wireless communication is also described, the computer program product comprising a non-transitory computer-readable medium storing instructions executable by a processor to: establish communications with one or more other UEs according to a first D2D mode, the first D2D mode based at least in part on a preconfigured pool of transmission resources; receive system information from a base station allocating a pool of resources for transmission; and switch to a second D2D mode, the second D2D mode being based on distributed transmission scheduling using the pool of resources allocated by the base station.

Some examples of the method, apparatuses, or computer program product described above may further comprise establishing a connected state with the base station; and switching to a third D2D mode, the third D2D mode being based on a centralized transmission resource schedule received from the base station subsequent to establishing the connected state.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
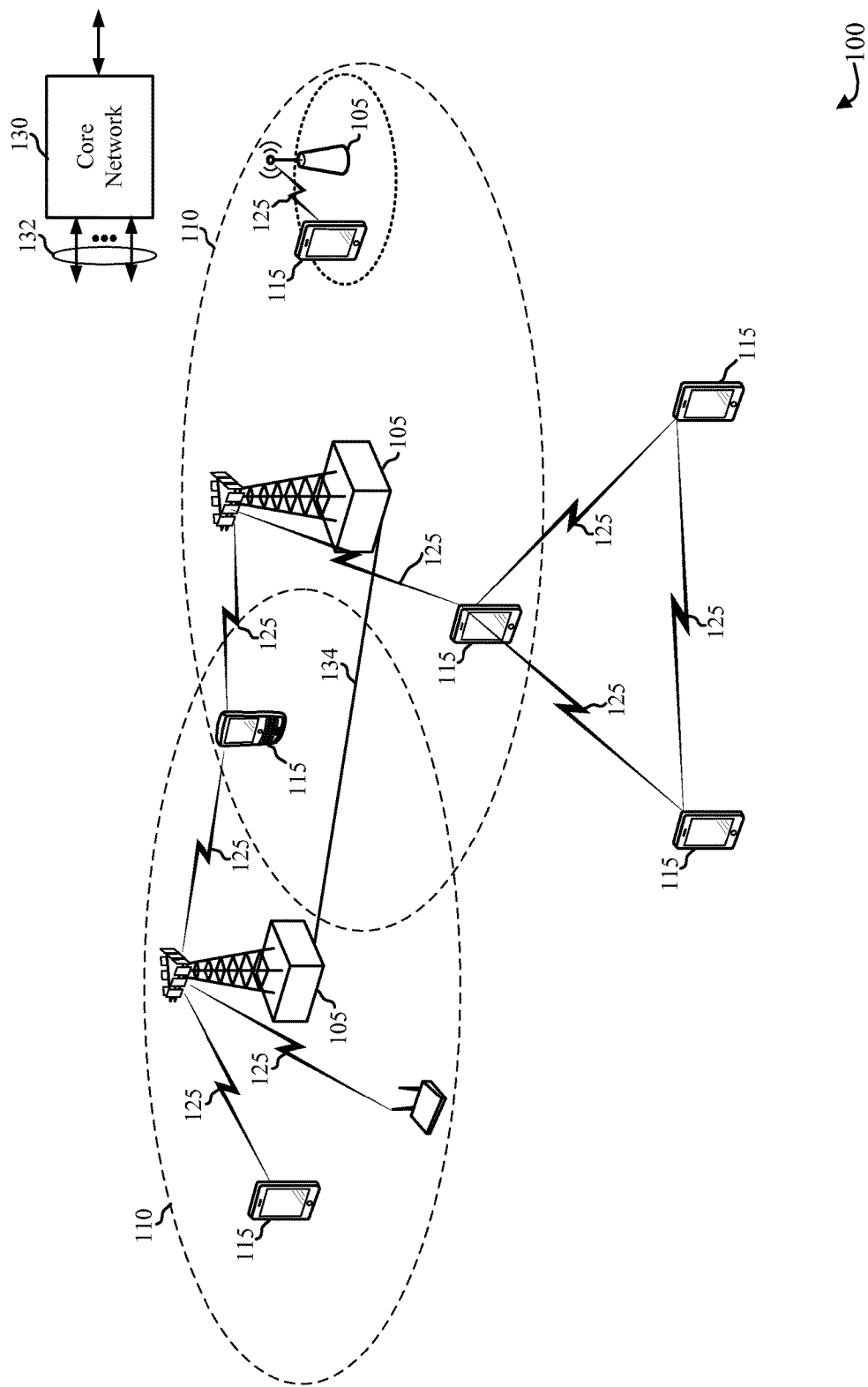
FIG. 1 illustrates an example of a wireless communications system in accordance with various embodiments.

The described features generally relate to one or more improved systems, methods, or apparatuses for switching a mode of operations in device to device (D2D) communications. A UE within the coverage area of a base station may communicate directly with other UEs using a centralized transmission resource schedule from the base station. Prior to experiencing radio link failure (RLF) with the base station, the UE may determine that one or more switching parameters have been met and initiate a transition to an intermediate mode that does not depend on a centralized schedule. The intermediate mode may be based on a distributed transmission schedule using a pool of resources established by the base station. In one example, the switching parameters may be received from the base station in a connection response message. In another example, the UE may send a switching request to the base station prior to initiating the transition to the intermediate mode. In some cases, after the transition to the intermediate mode, the UE may experience a radio link failure and transition to a distributed transmission mode using a predetermined pool of resources.

In another example, a UE communicates directly with other UEs using D2D communications based on a distributed transmission schedule using preconfigured resources prior to entering the coverage area of a base station. Upon entering the coverage area, the UE may receive system information with a pool of resources for use in D2D communications. The UE may switch to an intermediate mode based on distributed transmission schedule using the pool of resources indicated by the base station. In some cases, after switching to the intermediate mode, the UE may establish a connected state with the base station. After establishing the connected state, the UE may switch to a D2D communications mode based on a centralized transmission resource schedule.

Thus, the techniques described herein may enable efficient switching from a D2D mode that depends on a base station for centralized scheduling to a mode that uses distributed scheduling using preconfigured resources by utilizing an intermediate mode. This may enable users to make the transition in and out of a base station coverage area without experiencing a significant disruption in D2D communications. This may be particularly important for public safety teams employing direct D2D communications.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

FIG. 1 illustrates an example of a wireless communications system 100 in accordance with various embodiments. The system 100 includes base stations 105, communication devices, also known as a user equipment (UE) 115, and a core network 130. The base stations 105 may communicate with the UEs 115 under the control of a base station controller (not shown), which may be part of the core network 130 or the base stations 105 in various embodiments. Base stations 105 may communicate control information or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Wireless communication links 125 may be modulated according to various radio technologies. Each modulated signal may carry control information (e.g., reference signals, control channels, etc.), overhead information, data, etc. Wireless communication links 125 may also be established between UEs 115 in a configuration known as device to device (D2D) communications.

The base stations 105 may wirelessly communicate with the UEs 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, or pico base stations). There may be overlapping coverage areas for different technologies.

The system 100 may be a Heterogeneous LTE/LTE-A network in which different types of base stations provide coverage for various geographical regions. For example, each base station 105 may provide communication coverage for a macro cell, a pico cell, a femto cell, or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell.

The core network 130 may communicate with the base stations 105 via a backhaul 132 (e.g., S1, etc.). The base stations 105 may also communicate with one another, directly or indirectly, via backhaul links 134 (e.g., X2, etc.) or via backhaul links 132 (e.g., through core network 130). The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The UEs 115 are dispersed throughout the wireless communications system 100, and each UE may be stationary or mobile. A UE 115 may communicate with other UEs 115 using D2D communications. One or more of a group of UEs 115 utilizing D2D communications may be within the coverage area 110 of a cell. Other UEs 115 in such a group may be outside the coverage area 110 of a cell, or otherwise unable to receive transmissions from a base station 105. Groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communication links 125 shown in system 100 may include uplink (UL) transmissions from a UE 115 to a base station 105, or downlink (DL) transmissions, from a base station 105 to a UE 115 over DL carriers. They may also represent D2D communication links. The downlink transmissions may also be called forward link transmissions while the uplink transmissions may also be called reverse link transmissions.

Figure 2:
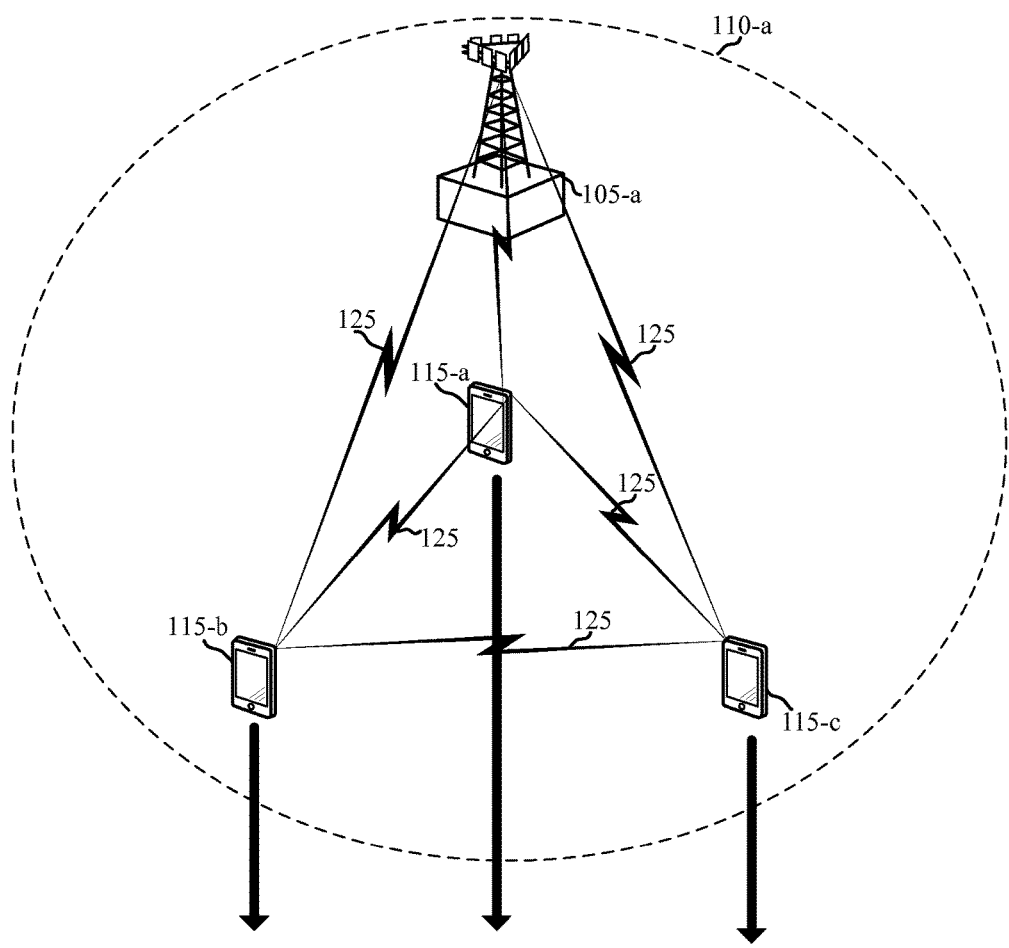
FIG. 2 illustrates an example of a wireless communication system in which UEs engaged in D2D communications are leaving a network coverage area in accordance with various embodiments.

FIG. 2 illustrates an example of a wireless communication system 200 in which UEs 115 *a-c* are engaged in D2D communications and are leaving a network coverage area 110-*a* in accordance with various embodiments. One or more UEs 115 may establish D2D communications within the coverage area 110-*a* of a base station 105-*a*. The UEs 115 may communicate directly using D2D communications Mode 1. Mode 1 may be based on a centralized transmission resource schedule received from base station 105-*a*. That is, the base station may direct the UEs 115 to use specific resources for transmission. The UEs 115 and base station 105-*a* may be examples of the UEs 115 and base stations 105 illustrated in FIG. 1.

If one or more UEs 115 are about to leave the coverage area 110-*a* of the cell, they may transition to a D2D communications Mode 2. Mode 2 may be based on distributed transmission scheduling using a pool of resources allocated by base station 105-*a*. That is, the UEs 115 may determine which resources to use within a set of resources indicated by the serving base station 105-*a*. In some cases, the transition to Mode 2 may be initiated by the user through an application on the UE 115. In other cases, the transition is initiated based on the determination that certain switching parameters have been met.

The switching parameters may be received from a base station 105-*a* or they may be configured prior to connection with a base station. The switching parameters may relate to an indication that a radio link failure (RLF) with the base station 105-*a* is imminent. In some cases, the switching parameters may include an out-of-sync (OOS) indication, a number of incorrectly received (bad) frames, a period of time, a number of correctly received (good) frames, a measure of path loss, a channel quality indication, or a signal-to-noise ratio (SINR). Other examples of criteria that may be used to determine when a UE should switch modes include a threshold number of random access channel (RACH) requests, a time period following an unsuccessful RACH attempt, a time period following a status report (SR), a buffer status report (BSR) or a resource request, or an indication of a handover failure or an incomplete handover. Determining that a handover complete message has not been sent may be an indication of an incomplete handover. The switching parameters above may apply both when the UE 115 is in a radio resource control (RRC) idle state and when it is in an RRC connected state. Parameters based on an imminent RLF may be more aggressive than another set of RLF parameters. That is, they may be configured to indicate an imminent RLF before the RLF actually occurs. Thus, in some cases a wireless link to a base station may be maintained after the D2D related RLF threshold is met.

After the transition to Mode 2, a UE 115 may continue to monitor for, and receive indications from the base station 105-*a* conveying a pool of resources to use for distributed transmission scheduling. In some cases, a UE 115 may be in a radio resource control (RRC) idle state while operating in D2D communications Mode 2. A UE may reset a protocol layer configuration (such as an RRC status or a Media Access Control (MAC) configuration) when switching modes. In other cases, the layer configuration may be maintained after switching modes.

After a UE 115 has left the coverage area or experienced RLF with the serving base station 105-*a*, the UE may determine that it may no longer be able to receive such resource grants. Then the UE 115 may switch to a D2D communications Mode 3. Mode 3 may be based on distributed transmission utilizing a preconfigured resource pool. As a result, in Mode 3 the UEs may not receive any messages from a base station 105-*a* and may transmit according to a schedule coordinated among the UEs 115 using a predetermined pool of resources. In some cases a protocol layer configuration may be changed after a switch to Mode 3 even though it was not changed subsequent to a switch to Mode 2.

In some cases the preconfigured switching parameters or transmission resource schedule may be determined as part of a connection process with the base station 105-*a*. For example, a UE 115-*a* may send a connection request that includes an indication that it may operate in a D2D mode. The base station 105-*a* may receive the request and transmit a connection response that includes one or more D2D parameters. The UE 115-*a* may receive the response and configure the switching parameters or Mode 3 transmission schedule accordingly.

In one example, a UE 115-*a* may send a mode switching request to base station 105-*a* prior to switching to Mode 2. The base station 105-*a* may then send a response either granting or denying the request. For example, the base station 105-*a* may deny the request if the UE 115-*a* has a low priority, or if the base station has a queue of data to transmit to UE 115-*a* and the transition would interfere with the communication link. After receiving permission to switch modes, the UE 115-*a* may initiate the transition. In some cases, a UE 115-*a* may also send a request to switch to Mode 3. However, the UE 115-*a* may experience RLF and in some cases may switch modes autonomously without waiting for a response.

In one example, a UE 115 may modify the switching parameters after switching modes according to a method of hysteresis to prevent rapid switching between D2D modes (i.e., ping ponging). The hysteresis may be based on a time period, a measure of path loss, a number of good or bad frames, an SINR, or another measure of channel quality. The UE 115 may wait until the hysteresis parameters are met before reconnecting with a base station 105-*a* or switching D2D modes.

In some cases, a UE may keep a log of information related to D2D mode switches. For example, it may record a time stamp, a location, a radio link condition, a velocity, a cell ID, a frequency or frequency range. The UE 115 may provide information related to prior D2D mode switches to a base station 105-*a* upon request or at preconfigured intervals.

Figure 3:
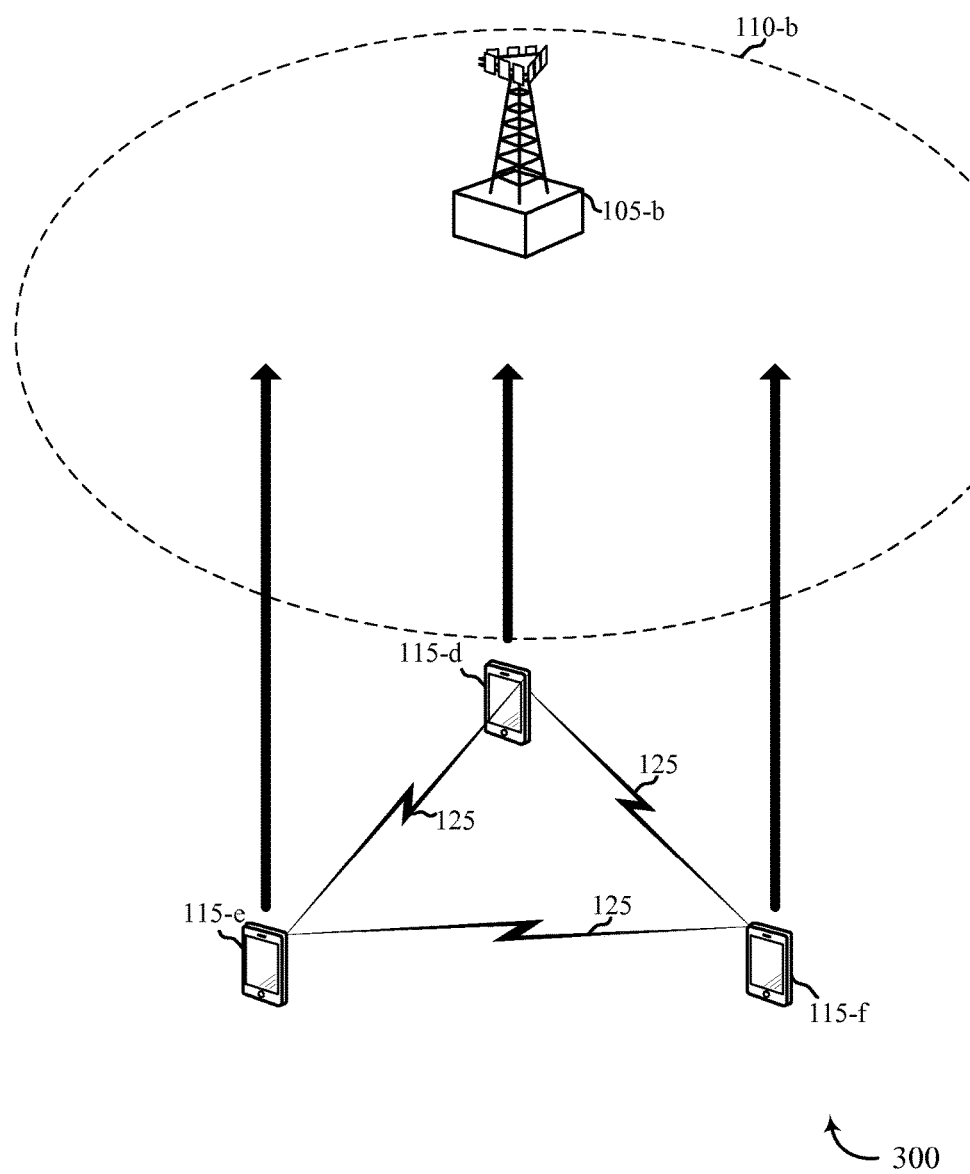
FIG. 3 illustrates an example of a wireless communication system in which UEs engaged in D2D communications are entering a network coverage area in accordance with various embodiments.

FIG. 3 illustrates an example of a wireless communication system 300 in which UEs 115 *d-f* are engaged in D2D communications and are entering a network coverage area 110-*b* in accordance with various embodiments. The UEs 115 and base station 105-*b* may be examples of the UEs 115 and base stations 105 illustrated in FIG. 1 or 2. One or more UEs 115 may establish D2D communications outside the coverage area 110-*b* of a base station 105-*b*. The UEs 115 may communicate directly using D2D communications Mode 3. Mode 3 may be based on distributed transmission utilizing a preconfigured resource pool. If one or more UEs 115 enter the coverage are 110-*b* of the cell, they may transition to a D2D communications Mode 2. Mode 2 may be based on distributed transmission scheduling using a pool of resources allocated by base station 105-*a*. The transition may be initiated based on the determination that certain switching parameters have been met. The switching parameters may be preconfigured. In some cases, the parameters may be related to receiving system information from the base station 105-*b* indicating a pool of resources that may be used for D2D communications.

In one example, after a UE 115 has made a transition to Mode 2, it may establish a connected state with the base station 105-*b*. Prior to being in a connected state the UE 115 may continue D2D communications in Mode 2. Subsequently, the UE 115 may switch to D2D communications Mode 1. Mode 1 may be based on a centralized transmission resource schedule received from base station 105-*b*.

Figure 4:
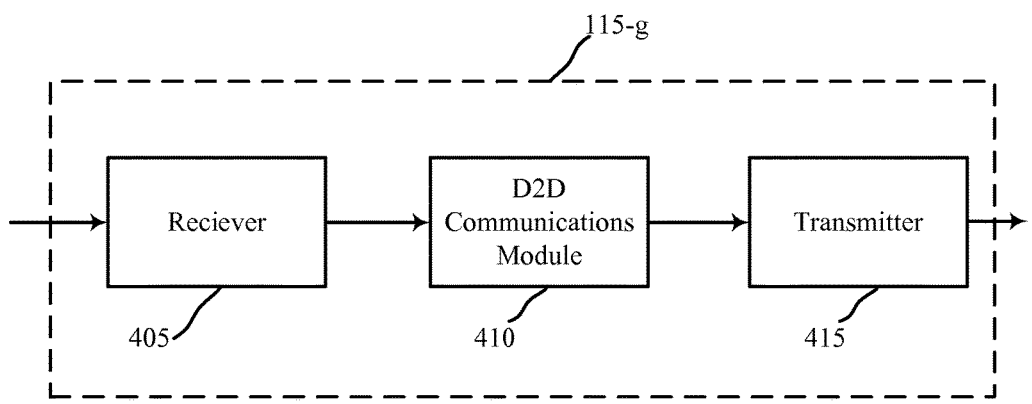
FIG. 4 shows a block diagram of a device for switching a mode of operations in D2D communications in accordance with various embodiments.

FIG. 4 shows a block diagram 400 of a device 115-*g* for switching a mode of operations in D2D communications in accordance with various embodiments. The device 115-*g* may include a UE that may be an example of one or more aspects of a UE 115 described with reference to FIGS. 1-3. The device 115-*g* may include a receiver 405, a D2D communications module 410, or a transmitter 415. The device 115-*g* may also be a processor. Each of these components may be in communication with each other.

The components of the device 115-*g* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver 405 may receive information such as packets, user data, or control information associated with various information channels (e.g., control channels, data channels, etc.). Information may be passed on to the D2D communications module 410, and to other components of the device 115-g. In some examples, the receiver 405 may be configured to receive a connection response message from the base station comprising one or more mode switching parameters. It may also be configured to receive a response from the base station indicating that a mode switch is allowed. In some cases, the receiver 405 may also be configured to receive system information from a base station allocating a pool of resources for transmission.

The D2D communications module 410 may be configured to establish communications with one or more other UEs according to a first D2D mode. In some cases, the first D2D mode may be based on a centralized transmission resource schedule received from a base station. For example, the first mode may be Mode 1 as described with reference to FIGS. 2-3. It may also be configured to determine that one or more mode switching parameters have been satisfied and switch to a second D2D mode before a radio link failure (RLF) occurs, the second D2D mode being based on distributed transmission scheduling using a pool of resources allocated by the base station. In one example, the second mode may be Mode 2 as described above. In some cases, the D2D communications module 410 may be configured to establish communications with one or more other UEs according to a D2D mode based on a preconfigured pool of transmission resources. For example, the first mode established may be Mode 3 as described above.

The transmitter 415 may transmit the one or more signals received from other components of the device 115-g. In some embodiments, the transmitter 415 may be collocated with the receiver 405 in a transceiver module. The transmitter 415 may include a single antenna, or it may include a plurality of antennas. In some cases, the transmitter 415 may be configured to send a connection setup request to a base station comprising a D2D mode indication. The transmitter 415 may also be configured to send a mode switching request to the base station.

Figure 5:
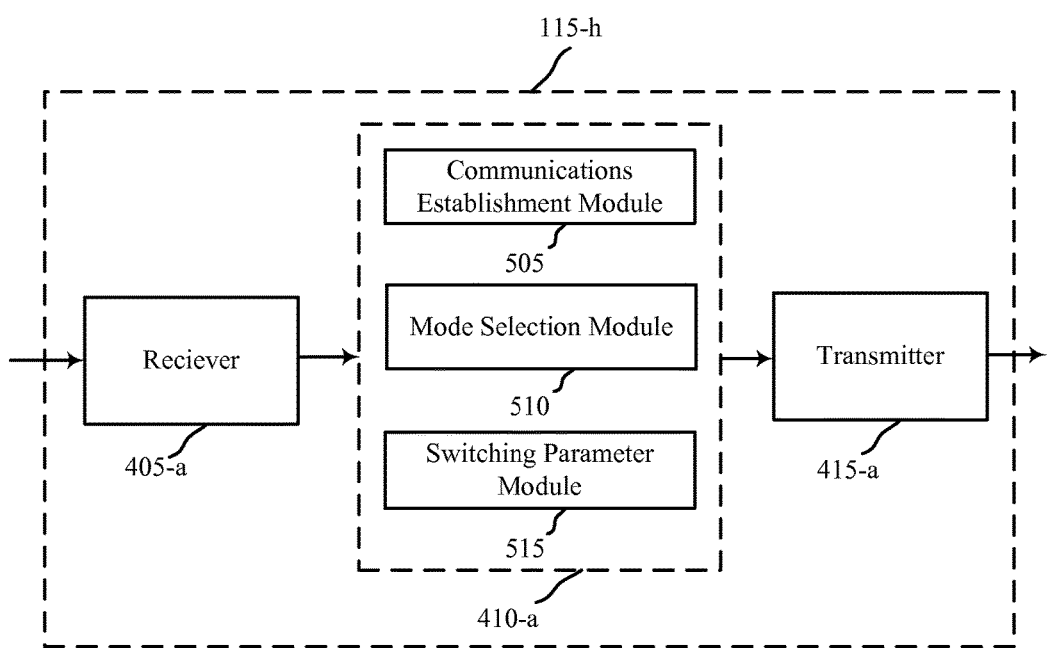
FIG. 5 shows a block diagram of a device for switching a mode of operations in D2D communications in accordance with various embodiments.

FIG. 5 shows a block diagram 500 of a device 115-h for switching a mode of operations in D2D communications in accordance with various embodiments. The device 115-h may include a UE that may be an example of one or more aspects of a UE 115 described with reference to FIGS. 1-4. The device 115-h may include a receiver 405-a, a D2D communications module 410-a, or a transmitter 415-a, which may be examples of the corresponding components of device 115-g. The device 115-h may be a processor. Each of these components may be in communication with each other. The D2D communications module 410-a may include a communications establishment module 505, a mode selection module 510, and a switching parameter module 515. The receiver 405-a and the transmitter 415-a may perform the functions of the receiver 405 and the transmitter 415, of FIG. 4, respectively.

The components of the device 115-h may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The communications establishment module 505 may be configured to establish communications with one or more other UEs according to a first D2D mode. In some cases the first D2D mode may be based on a centralized transmission resource schedule received from a base station. In some cases, the first D2D mode may be based on a preconfigured pool of transmission resources.

The mode selection module 510 may be configured to select a D2D communications mode. For example, it may be configured to select between Mode 1, Mode 2, and Mode 3 as described with reference to FIGS. 2-3. In some cases, the mode selection module 510 may be configured to switch from a first D2D mode to a second D2D mode, the second D2D mode based on a distributed transmission scheduling using the pool of resources allocated by the base station.

The switching parameter module 515 may be configured to store a set of switching parameters and determine whether conditions based on the parameters have been met. In some cases, the switching parameters may be modified radio link failure (RLF) criteria. These criteria may be configured so that the device 115-h may switch D2D modes prior to an actual RLF. Thus, the mode switching parameters may be configured so that the D2D mode switching criteria are satisfied prior to unmodified RLF criteria being met. Examples of switching parameters include an out of sync indication related to a number of bad frames, an in sync indication related to a number of good frames, a time period, a path loss threshold and signal to noise (SINR) ratio threshold. Other examples include a threshold number of random access channel (RACH) requests, a time period following a status report (SR) or a resource request, or an indication of a handover failure or an incomplete handover. In some cases, the switching parameter module 515 may determine that one or more mode switching parameters have been satisfied and wait until a time period has elapsed before switching to a different D2D mode. In one embodiment, the mode switching parameter may be an indication from a user application.

The switching parameter module 515 may monitor one or more of the parameters above and coordinate with the mode selection module 510 to determine when the device 115-h should switch from one D2D mode to another. The switching parameters may be preconfigured prior to communicating with a base station 105, received from a base station 105 during a connection procedure, or received from a base station 105 through a system information broadcast (e.g., a system information block (SIB) broadcast).

Figure 6:
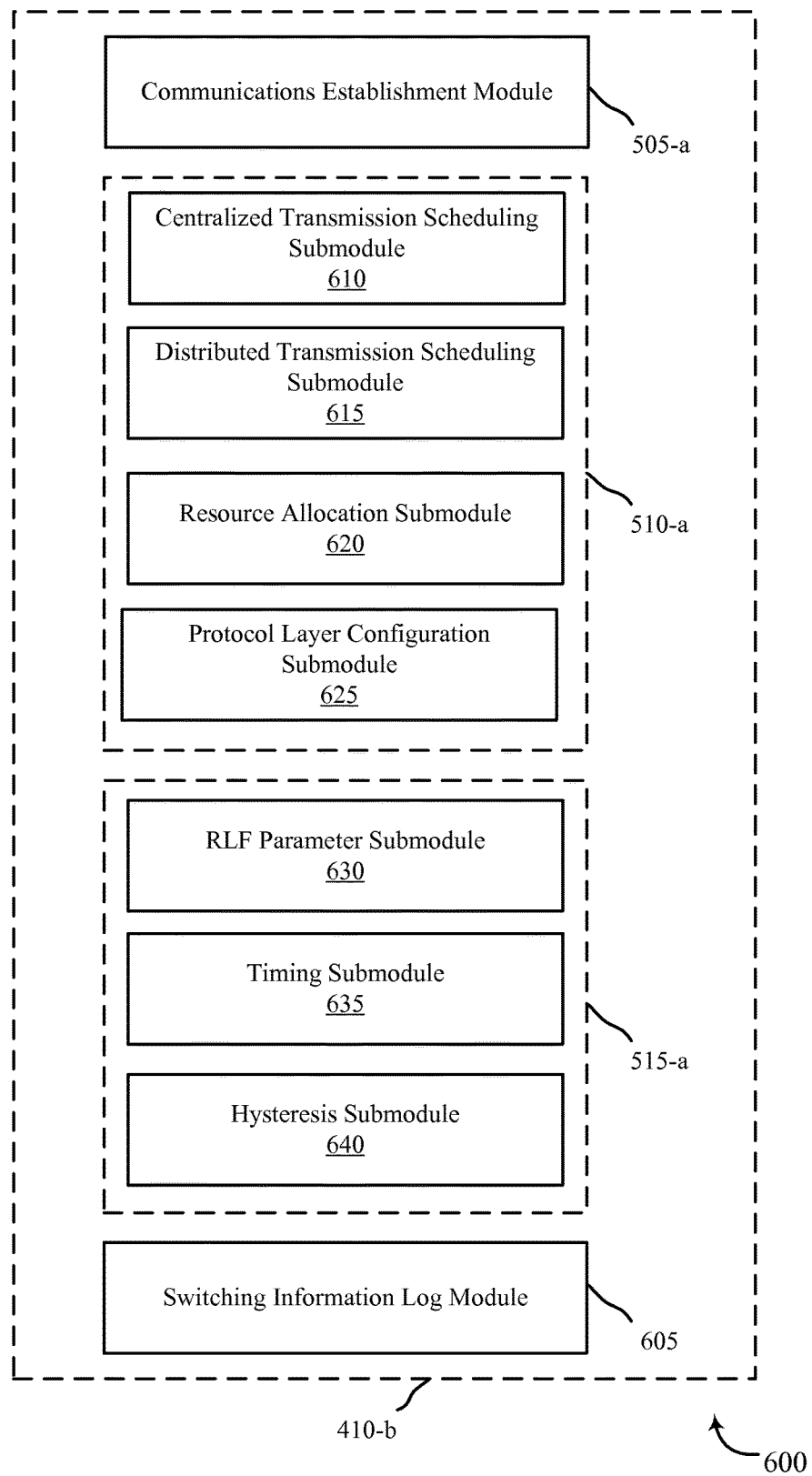
FIG. 6 shows a block diagram of a D2D communications module in accordance with various embodiments.

FIG. 6 shows a block diagram 600 of a D2D communications module 410-b that may be an example of one or more aspects of a D2D communications module 410 described with reference to FIGS. 4-5.

D2D communications module 410-b may include a communications establishment module 505-a, a mode selection module 510-*a*, and a switching parameter module 515-*a* that may examples of the corresponding components of device 115-*h* with reference to FIG. 5. D2D communications module 410-*b* may also include a switching information log module 605. Mode selection module 510-*a* may include a centralized transmission scheduling sub-module 610, a distributed transmission scheduling sub-module 615, a resource allocation sub-module 620, and a protocol layer configuration sub-module 625. Switching parameter sub-module 515-*a* may include a radio link failure (RLF) sub-module 630, a timing sub-module 635, and a hysteresis sub-module 640.

Switching information log module 605 may be configured to store a mode switch information log comprising one or more of a time stamp, a UE location, a radio interface condition, a UE velocity, a cell ID, and a carrier frequency. The switching log information may be provided to a base station 105 upon request or at predetermined intervals. In some cases, the switching information may be subsequently used to evaluate network coverage or refine the mode switching process.

Centralized transmission scheduling sub-module 610 may configure a UE 115 for a D2D mode based on a transmission schedule received from a base station 105. For example, the centralized transmission scheduling sub-module 610 may be used to configure a UE for D2D Mode 1 communications. Mode 1 operations may be conducted while a UE is within the coverage area 110 of a base station 105, and has not determined that RLF is imminent.

Distributed transmission scheduling sub-module 615 may configure a UE 115 for a D2D mode based on a distributed transmission schedule. That is, a UE 115 may schedule transmissions in coordination with other UEs 115 rather than relying on a base station 105 for centralized scheduling. D2D communication Mode 2 and Mode 3 may be examples of distributed transmission scheduling. Mode 2 and Mode 3 operations may be appropriate when a UE 115 has experienced RLF, an unsuccessful handover, is out of a base station 105 coverage area, or is in transition between connection states. A UE 115 may also utilize distributed transmission scheduling when directed by a user.

Resource allocation sub-module 620 may be configured to determine a set of resources the UE may use for transmission during D2D communications. In some cases the resource allocation sub-module 620 may determine that the UE may use specific resources as directed by a base station 105 while the UE is operating in a centralized D2D transmission scheduling mode such as Mode 1 described above. In other cases, the resource allocation sub-module 620 may determine that the UE may use resources from a pool of resources indicated by a base station 105 in a UE specific message or in a system information block (SIB) broadcast transmission. This may be an example of Mode 2 D2D communications. In other cases, the resource allocation sub-module 620 may determine that the UE must use a preconfigured pool of resources, as in D2D Mode 3 operations. A preconfigured pool of resources may be used when a UE is not within the coverage area of a base station 105 or otherwise cannot receive system information broadcasts.

Protocol layer configuration sub-module 625 may configure radio protocol configurations during a mode switch. For example, it may reconfigure a media access control (MAC) or a radio link control (RLC) configuration after switching to the D2D Mode 2. In some cases, the protocol layer configuration sub-module 625 may maintain the same configuration after a mode switch. In some cases, the protocol layer configuration sub-module 625 may set a media access control (MAC) or a radio link control (RLC) configuration according to a predetermined state after switching to the second D2D mode.

Radio link failure (RLF) sub-module 630 may be configured to store a set of RLF related switching parameters and determine whether conditions based on the parameters have been met. The switching parameters may be modified radio link failure (RLF) criteria. These criteria may be configured so that the UE 115 may switch D2D modes prior to an actual RLF. Thus, the mode switching parameters may be configured so that the D2D mode switching criteria are satisfied prior to unmodified RLF criteria being met. Examples of switching parameters include an out of sync indication related to a number of bad frames, an in sync indication related to a number of good frames, a time period, a path loss threshold and signal to noise (SINR) ratio threshold.

Timing sub-module 635 may determine whether timing parameters have met. For example, a UE 115 may switch modes autonomously a certain time period after one or more channel quality related parameters have been satisfied, or after sending a message to a base station 105 and waiting for a response. The timing sub-module 635 may also coordinate with the hysteresis module to prevent a UE from rapidly switching between D2D modes.

Hysteresis sub-module 640 may be configured to maintain a set of hysteresis parameters and determine whether the parameters have been met. Hysteresis parameters may be configured to prevent a UE 115 from rapidly switching D2D modes or connection status (i.e., ping ponging). The hysteresis parameters may include at least one of a time period, a path loss parameter, a number of good frames, and a signal to noise ratio (SINR). A UE 115 may be configured such that even if another set of switching parameters indicates that a switching threshold has been met, the UE 115 may continue communications based on distributed transmission scheduling until the hysteresis parameters are met.

Figure 7:
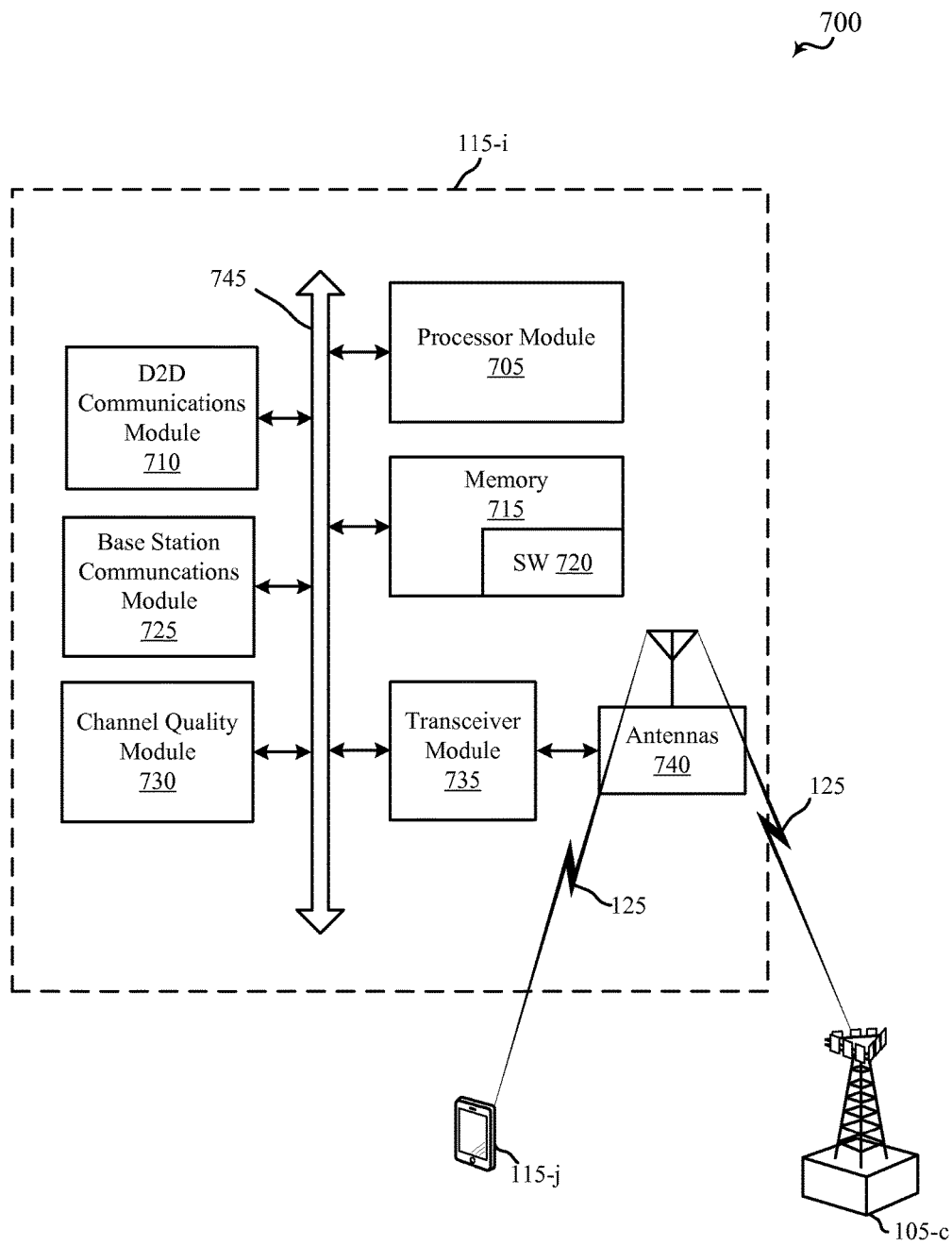
FIG. 7 a block diagram of a system for switching a mode of operations in D2D communications in accordance with various embodiments.

FIG. 7 shows a diagram of a system 700 for switching a mode of operations in D2D communications in accordance with various embodiments. System 700 may include a UE 115-*i*, which may be an example of the UEs 115 of FIGS. 1-5. The UE 115-*i* may generally include components for bi-directional voice and data communications including components for transmitting communications and components for receiving communications.

The UE 115-*i* may include antenna(s) 740, a transceiver module 735, a processor module 705, and memory 715 (including software (SW) 720), which each may communicate, directly or indirectly, with each other (e.g., via one or more buses 845). The transceiver module 735 may be configured to communicate bi-directionally, via the antenna(s) 740 or one or more wired or wireless links, with one or more networks, as described above. For example, the transceiver module 735 may be configured to communicate bi-directionally with a base station 105-*c* or another UE 115-*j*. The transceiver module 735 may include a modem configured to modulate the packets and provide the modulated packets to the antenna(s) 740 for transmission, and to demodulate packets received from the antenna(s) 740. While the UE 115-*i* may include a single antenna 740, the UE 115-*i* may also have multiple antennas 740 capable of concurrently transmitting or receiving multiple wireless transmissions. The transceiver module 735 may be capable of concurrently communicating with one or more base stations 105 via multiple component carriers.

The UE 115-*i* may include a D2D communications module 710, which may perform the functions described by the D2D communications modules 410 of FIGS. 4-6. The UE 115-*i* may also include a channel quality module 730 and a base station communications module 725. The channel quality module 730 may perform channel measurements and interference measurements for communications links 125. For example, it may measure channel quality indicators that may be used as switching parameters such as a path loss parameter or an SINR.

The base station communications module 725 may be configured to manage communications with a base station 105. In some cases, coordination with a base station 105 may be part of the D2D communications mode or mode switch. For example, the base station communications module 725 may be configured to monitor communications from the base station for an indication of the pool of resources and determine that a message from the base station indicating the pool of resources is not receivable. In another example, the base station communications module 725, in coordination with the transceiver 735, may send a connection setup request to the base station 105. The connection setup request may include a D2D mode indication. It may also receive a connection response message from the base station with one or more mode switching parameters. In another example, the base station communications module 725, in coordination with the transceiver 735, may send a mode switching request to a base station 105, and receive a mode switching response. The mode switching request may indicate whether the request is user initiated. The response may grant the request or, in some cases, deny the switching request. The base station communications module 725 may also receive information from a base station scheduling D2D transmissions or allocating a pool of resources for D2D communications.

The memory 715 may include random access memory (RAM) and read-only memory (ROM). The memory 715 may store computer-readable, computer-executable software/firmware code 720 containing instructions that are configured to, when executed, cause the processor module 705 to perform various functions described herein (e.g., call processing, database management, processing of carrier mode indicators, reporting CSI, etc.). Alternatively, the software/firmware code 720 may not be directly executable by the processor module 705 but be configured to cause a computer (e.g., when compiled and executed) to perform functions described herein. The processor module 705 may include an intelligent hardware device, (e.g., a central processing unit (CPU), a microcontroller, an application-specific integrated circuit (ASIC), etc.).

Figure 8:
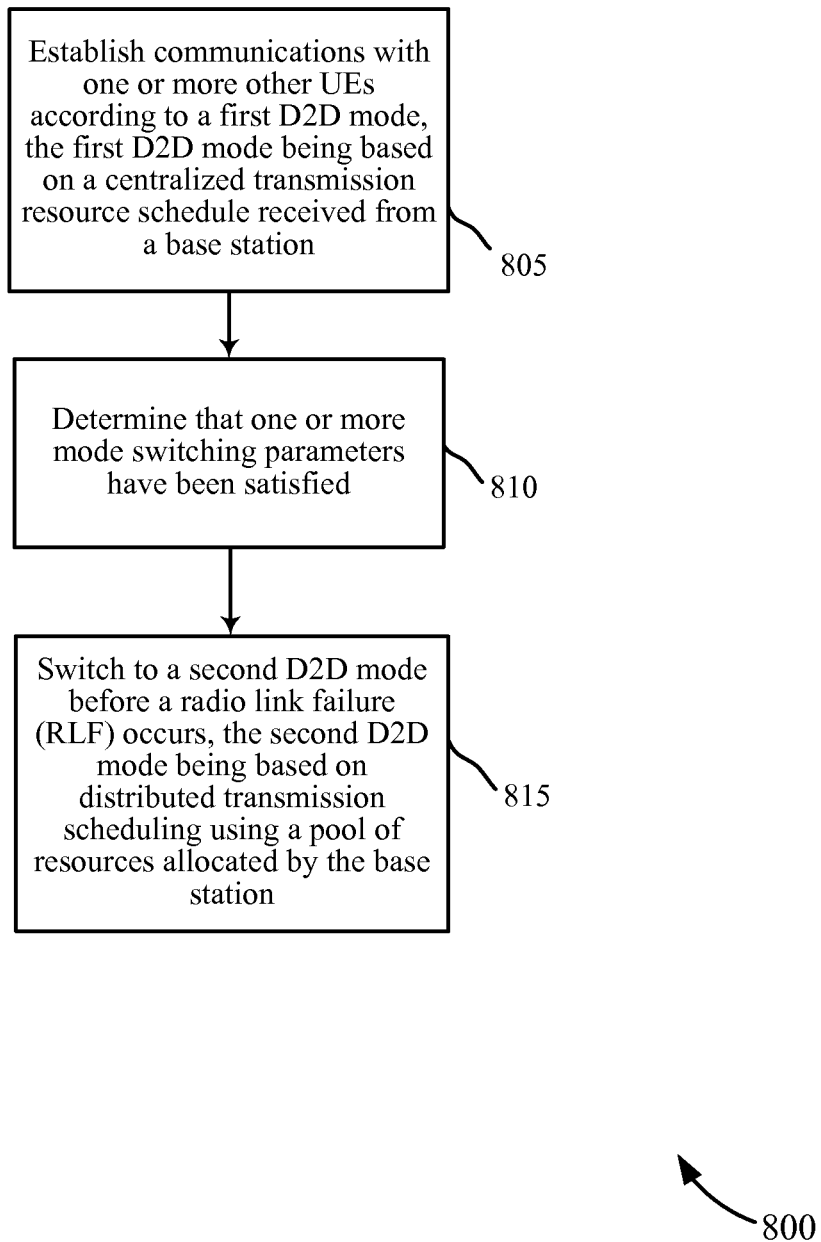
FIG. 8 shows a flowchart illustrating a method for switching a mode of operations in D2D communications when a UE is leaving a base station coverage area.

FIG. 8 shows a flowchart 800 illustrating a method for switching a mode of operations in D2D communications in accordance with various embodiments. The functions of flowchart 800 may be implemented by a UE 115 or its components as described with reference to FIGS. 1-7. In certain examples, the blocks of the flowchart 800 may be performed by a D2D communications module 410 of FIGS. 4-6.

At block 805, the UE 115 may establish communications with one or more other UEs according to a first D2D mode, the first D2D mode based on a centralized transmission resource schedule received from a base station. For example, the first D2D mode may be D2D Mode 1 as described above with reference to FIG. 2. In certain examples, the functions of block 805 may be performed by communications establishment module 505.

At block 810, the UE 115 may determine that one or more mode switching parameters have been satisfied. In some cases, the switching parameters may be modified radio link failure (RLF) criteria. These criteria may be configured so that the UE 115 may switch D2D modes prior to an actual RLF. Thus, the mode switching parameters may be configured so that the D2D mode switching criteria are satisfied prior to unmodified RLF criteria being met. Examples of switching parameters include an out of sync indication related to a number of bad frames, an in sync indication related to a number of good frames, a time period, a path loss threshold and signal to noise (SINR) ratio threshold. Other examples include a threshold number of random access channel (RACH) requests, a time period following a status report (SR) or a resource request, or an indication of a handover failure or an incomplete handover. In certain examples, the functions of block 810 may be performed by switching parameter module 515.

At block 815, the UE 115 may switch to a second D2D mode before a radio link failure (RLF) occurs, the second D2D mode based on distributed transmission scheduling using a pool of resources allocated by the base station. The second D2D mode may be D2D Mode 2 as described above with reference to FIG. 2. In certain examples, the functions of block 815 may be performed by mode selection module 510.

It should be noted that the method 800 is just one implementation and that the operations of the method 800 may be rearranged or otherwise modified such that other implementations are possible.

Figure 9:
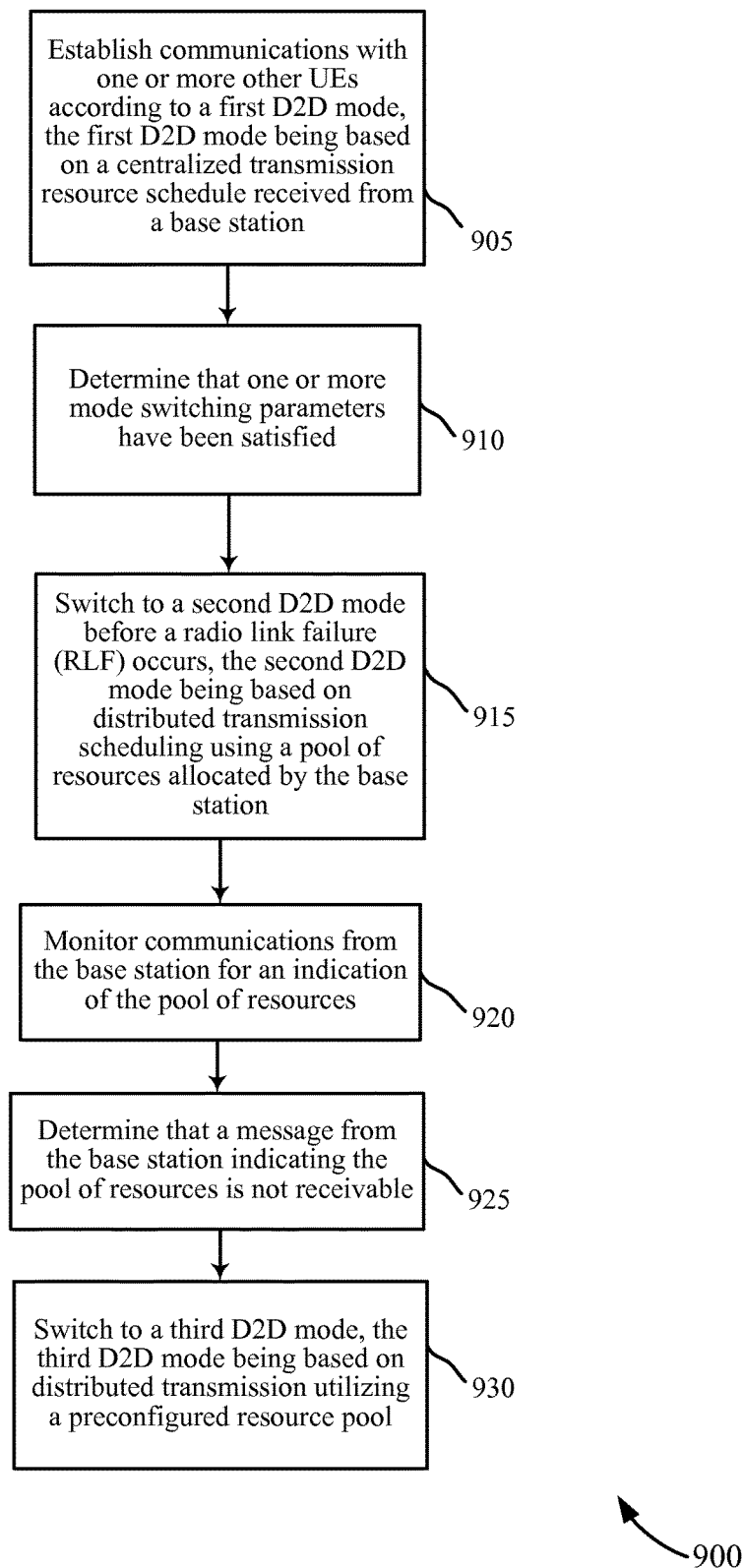
FIG. 9 shows a flowchart illustrating a method for switching a mode of operations in D2D communications in accordance with various embodiments.

FIG. 9 shows a flowchart 900 illustrating a method for switching a mode of operations in D2D communications in accordance with various embodiments. The functions of flowchart 900 may be implemented by a UE 115 or its components as described with reference to FIGS. 1-7. In certain examples, the functions of flowchart 900 may be performed by a D2D communications module 410 of FIGS. 4-6. Flowchart 900 may also incorporate the aspects of flowchart 800 of FIG. 8.

At block 905, the UE 115 may establish communications with one or more other UEs according to a first D2D mode, the first D2D mode based on a centralized transmission resource schedule received from a base station. In certain examples, the functions of block 905 may be performed by communications establishment module 505. At block 910, the UE 115 may determine that one or more mode switching parameters have been satisfied. In certain examples, the functions of block 910 may be performed by switching parameter module 515. At block 915, the UE 115 may switch to a second D2D mode before a radio link failure (RLF) occurs, the second D2D mode being based on distributed transmission scheduling using a pool of resources allocated by the base station. In certain examples, the functions of block 915 may be performed by mode selection module 510.

At block 920, the UE 115 may monitor communications from the base station for an indication of the pool of resources that it may use for transmission. In some cases, this may be received in a system information block (SIB) broadcast. In certain examples, the functions of block 920 may be performed by base station communications module 725.

At block 925, the UE 115 may determine that a message from the base station 105 indicating the pool of resources is not receivable. For example, the UE 115 may have left the coverage area of the base station 105, it may have experienced RLF, or it may have undergone a failed handover. In certain examples, the functions of block 925 may be performed by base station communications module 725.

At block 930, the UE 115 may switch to a third D2D mode, the third D2D mode being based on distributed transmission utilizing a preconfigured resource pool. For example, the third D2D mode may be D2D Mode 3 described above with reference to FIG. 2. In certain examples, the functions of block 930 may be performed by mode selection module 510.

It should be noted that the method 900 is just one implementation and that the operations of the method 900 may be rearranged or otherwise modified such that other implementations are possible.

Figure 10:
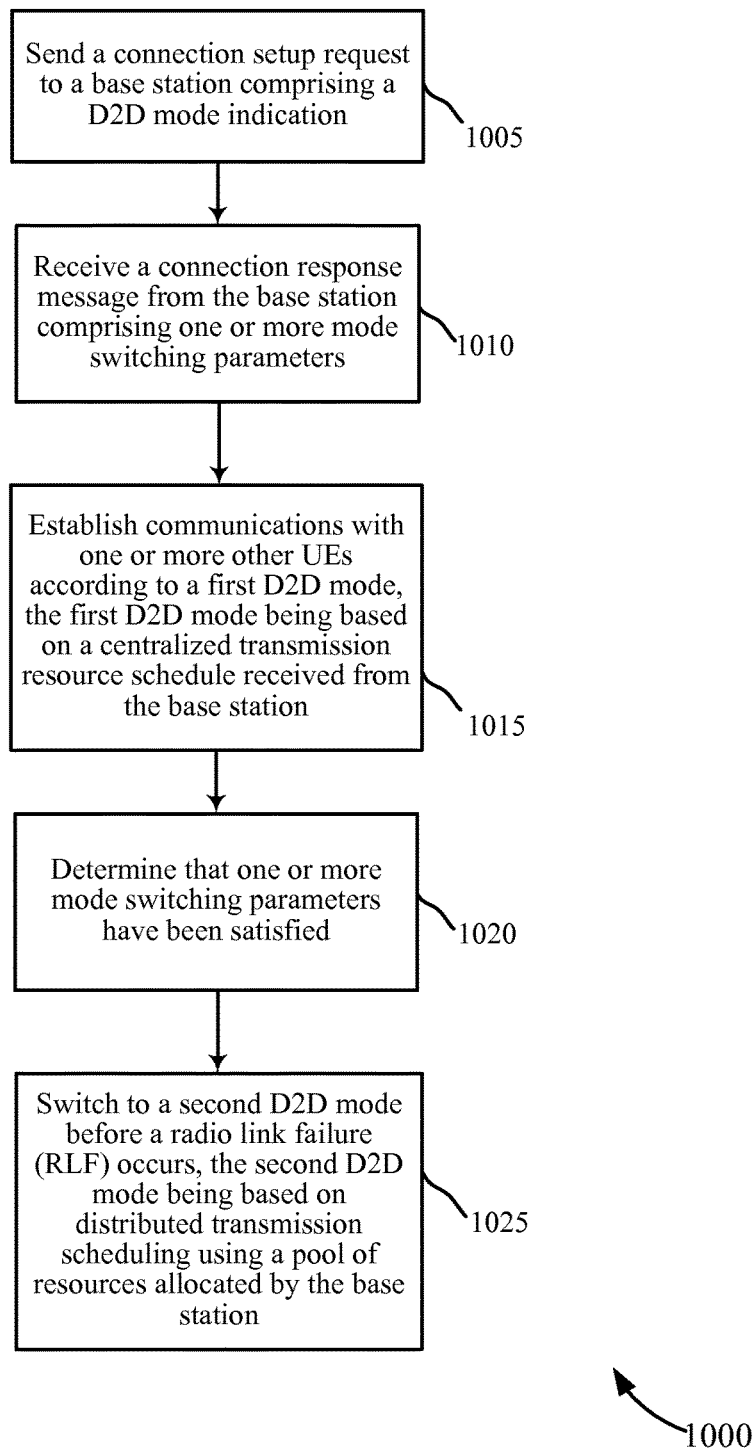
FIG. 10 shows a flowchart illustrating a method for switching a mode of operations in D2D communications in accordance with various embodiments.

FIG. 10 shows a flowchart 1000 illustrating a method for switching a mode of operations in D2D communications in accordance with various embodiments. The functions of flowchart 1000 may be implemented by a UE 115 or its components as described with reference to FIGS. 1-7. In certain examples, the functions of flowchart 1000 may be performed by a D2D communications module 410 of FIGS. 4-6. Flowchart 1000 may also incorporate the aspects of flowcharts 800 and 900 of FIGS. 8-9.

At block 1005, the UE 115 may send a connection setup request to a base station comprising a D2D mode indication. That is, the UE 115 may indicate to the base station 105 that it will be communicating directly with other UEs 115. Thus, the base station may allocate resources for D2D communications. In certain examples, the functions of block 1005 may be performed by base station communications module 725 or transmitter 415.

At block 1010, the UE 115 may receive a connection response message from the base station comprising one or more mode switching parameters. Thus, in some cases the base station 105 may determine the parameters based on which the UE 115 may switch from one D2D mode to another. In certain examples, the functions of block 1015 may be performed by base station communications module 725 or receiver 405.

At block 1015, the UE 115 may establish communications with one or more other UEs according to a first D2D mode, the first D2D mode based on a centralized transmission resource schedule received from a base station. In certain examples, the functions of block 1015 may be performed by communications establishment module 505. At block 1020, the UE 115 may determine that one or more mode switching parameters have been satisfied. In certain examples, the functions of block 1020 may be performed by switching parameter module 515. At block 1025, the UE 115 may switch to a second D2D mode before a radio link failure (RLF) occurs, the second D2D mode based on distributed transmission scheduling using a pool of resources allocated by the base station. In certain examples, the functions of block 1025 may be performed by mode selection module 510.

It should be noted that the method 1000 is just one implementation and that the operations of the method 1000 may be rearranged or otherwise modified such that other implementations are possible.

Figure 11:
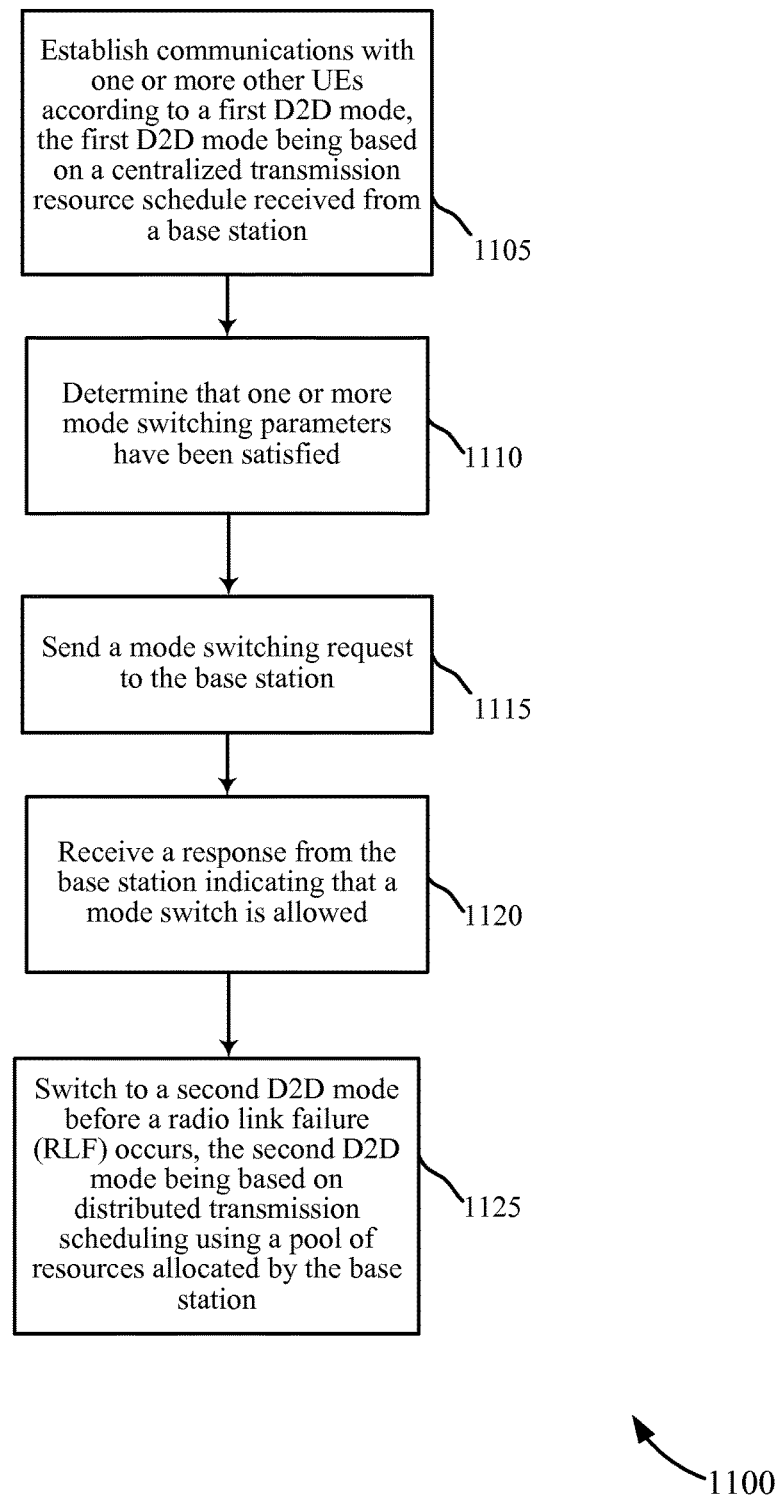
FIG. 11 shows a flowchart illustrating a method for switching a mode of operations in D2D communications in accordance with various embodiments.

FIG. 11 shows a flowchart 1100 illustrating a method for switching a mode of operations in D2D communications in accordance with various embodiments. The functions of flowchart 1100 may be implemented by a UE 115 or its components as described with reference to FIGS. 1-7. In certain examples, the functions of flowchart 1100 may be performed by a D2D communications module 410 of FIGS. 4-6. Flowchart 1100 may also incorporate the aspects of flowcharts 800, 900, and 1000 of FIGS. 8-10.

At block 1105, the UE 115 may establish communications with one or more other UEs according to a first D2D mode, the first D2D mode being based on a centralized transmission resource schedule received from a base station. In certain examples, the functions of block 1105 may be performed by communications establishment module 505. At block 1110, the UE 115 may determine that one or more mode switching parameters have been satisfied. In certain examples, the functions of block 1110 may be performed by switching parameter module 515.

At block 1115, the UE 115 may send a mode switching request to the base station. In some examples, the mode switching request may include an indication of whether the switch was initiated based on meeting mode switching parameters of if it is a user initiated switching request. In certain examples, the functions of block 1115 may be performed by base station communications module 725 or transmitter 415.

At block 1120, the UE 115 may receive a response from the base station indicating that a mode switch is allowed. In some cases, the UE 115 may receive a response that a mode switch is not allowed. In this case, the UE may not proceed to block 1125. In some cases, the UE 115 may initiate a mode switch autonomously after waiting for a certain time period and not receiving a response from a base station 105. In certain examples, the functions of block 1120 may be performed by base station communications module 725 or receiver 405.

At block 1125, the UE 115 may switch to a second D2D mode before a radio link failure (RLF) occurs, the second D2D mode being based on distributed transmission scheduling using a pool of resources allocated by the base station. In certain examples, the functions of block 1125 may be performed by mode selection module 510.

It should be noted that the method 1100 is just one implementation and that the operations of the method 1100 may be rearranged or otherwise modified such that other implementations are possible.

Figure 12:
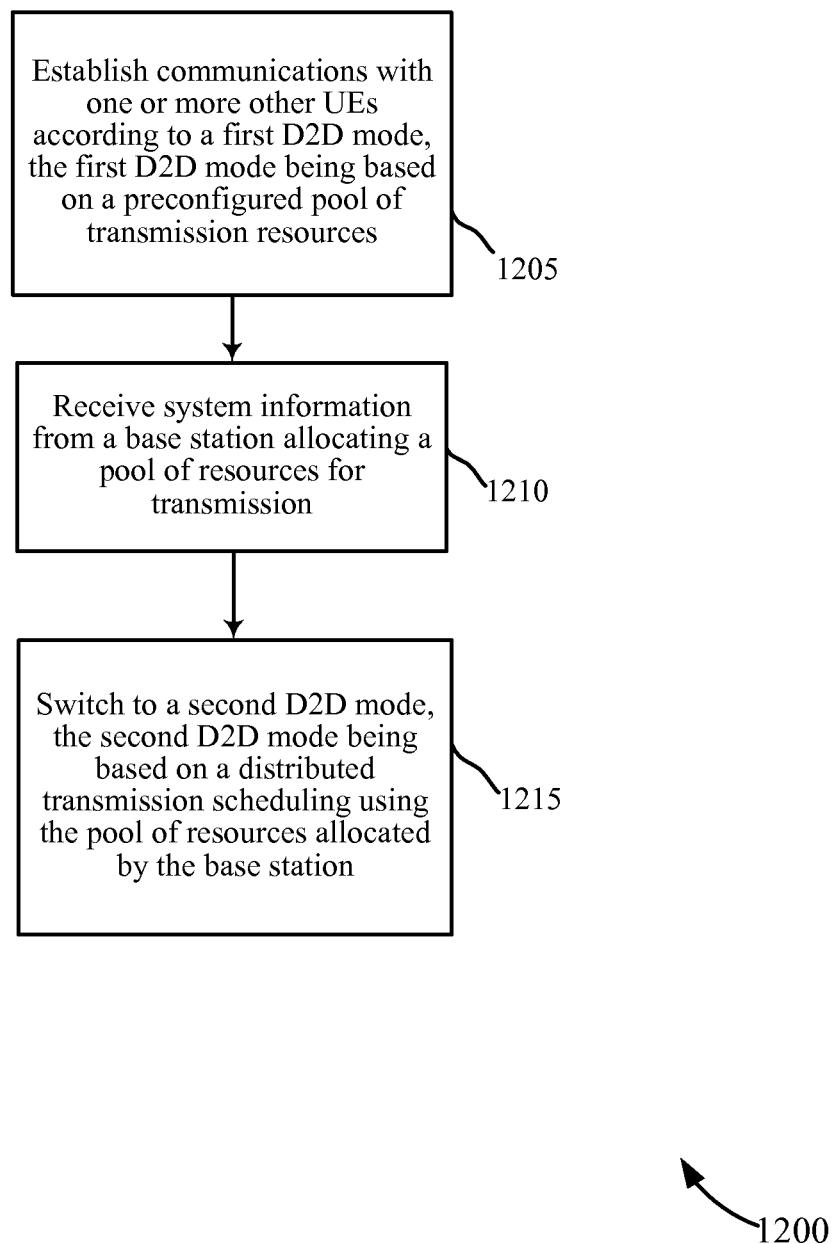
FIG. 12 shows a flowchart illustrating a method for switching a mode of operations in D2D communications when a UE is entering a base station coverage area.

FIG. 12 shows a flowchart 1200 illustrating a method for switching a mode of operations in D2D communications in accordance with various embodiments. The functions of flowchart 1200 may be implemented by a UE 115 or its components as described with reference to FIGS. 1-7. In certain examples, the functions of flowchart 1200 may be performed by a D2D communications module 410 of FIGS. 4-6.

At block 1205, the UE 115 may establish communications with one or more other UEs according to a first D2D mode, the first D2D mode based on a preconfigured pool of transmission resources. For example, the UE 115 may be outside of the coverage are of a base station 105, and may initiate communications with other UEs 115 according to D2D Mode 3 as described above with reference to FIG. 3. In certain examples, the functions of block 1205 may be performed by communications establishment module 505.

At block 1210, the UE 115 may receive system information from a base station allocating a pool of resources for transmission. In some cases, the UE may receive system information after entering the coverage area of the base station 105. In certain examples, the functions of block 1310 may be performed by base station communications module 725 or receiver 405.

At block 1215, the UE 115 may switch to a second D2D mode, the second D2D mode based on a distributed transmission scheduling using the pool of resources allocated by the base station. For example, the second mode may be D2D Mode 2 as described above with reference to FIG. 3. Thus, the UE 115 may not immediately attempt to communicate using D2D Mode 1 when it enters a base station coverage area. Rather, it may first transition to the intermediate Mode 2. In certain examples, the functions of block 1215 may be performed by mode selection module 510.

It should be noted that the method 1200 is just one implementation and that the operations of the method 1200 may be rearranged or otherwise modified such that other implementations are possible.

Figure 13:
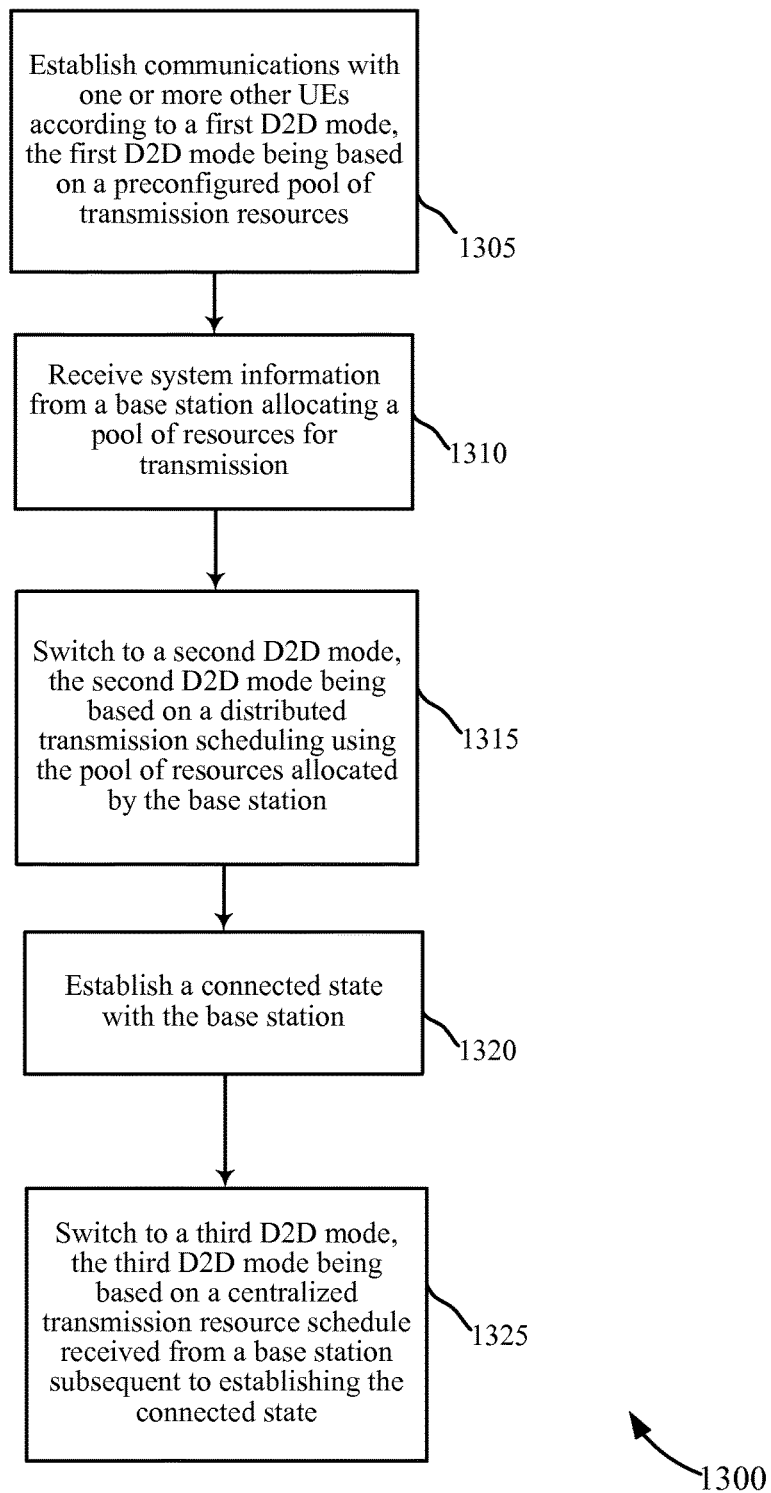
FIG. 13 shows a flowchart illustrating a method for switching a mode of operations in D2D communications in accordance with various embodiments.

FIG. 13 shows a flowchart 1300 illustrating a method for switching a mode of operations in D2D communications in accordance with various embodiments. The functions of flowchart 1300 may be implemented by a UE 115 or its components as described with reference to FIGS. 1-7. In certain examples, the functions of flowchart 1300 may be performed by a D2D communications module 410 of FIGS. 4-6. Flowchart 1300 may also incorporate the aspects of flowchart 1200 of FIG. 12.

At block 1305, the UE 115 may establish communications with one or more other UEs according to a first D2D mode, the first D2D mode based on a preconfigured pool of transmission resources. In certain examples, the functions of block 1305 may be performed by communications establishment module 505. At block 1310, the UE 115 may receive system information from a base station allocating a pool of resources for transmission. In certain examples, the functions of block 1310 may be performed by base station communications module 725 or receiver 405. At block 1315, the UE 115 may switch to a second D2D mode, the second D2D mode based on a distributed transmission scheduling using the pool of resources allocated by the base station. In certain examples, the functions of block 1315 may be performed by mode selection module 510.

At block 1320, the UE 115 may establish a connected state with the base station. At block 1325, the UE 115 may switch to a third D2D mode, the third D2D mode being based on a centralized transmission resource schedule received from a base station subsequent to establishing the connected state. For example, the third D2D mode may be D2D Mode 1 as described above with reference to FIG. 3. Thus, the UE 115 may wait until it has achieved connected status before attempting to utilize a centralized scheduling mode for D2D communications. In certain examples, the functions of block 1325 may be performed by mode selection module 510.

It should be noted that the method 1300 is just one implementation and that the operations of the method 1300 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of device to device (D2D) wireless communication at a user equipment (UE), comprising:
receiving a connection response message from a base station comprising one or more mode switching parameters, the one or more switching parameters relating to an indication of an imminent radio link failure (RLF) with the base station;
establishing communications with one or more other UEs according to a first D2D mode, the first D2D mode based at least in part on a centralized transmission resource schedule received from the base station;
determining that the one or more mode switching parameters have been satisfied;
switching to a second D2D mode before the RLF occurs, the second D2D mode based at least in part on a distributed transmission scheduling using a first indication of a pool of resources allocated by the base station;
monitoring communications from the base station for a second indication of the pool of resources;
determining that a message from the base station indicating the pool of resources is not available; and
switching to a third D2D mode, the third D2D mode based at least in part on a distributed transmission utilizing a preconfigured resource pool.

2. The method of claim 1, further comprising:
sending a connection setup request to the base station, the connection setup request comprising a D2D mode indication.

3. The method of claim 2, further comprising:
receiving one or more mode switching parameters via a broadcasted system information block (SIB) message.

4. The method of claim 1, wherein the one or more mode switching parameters comprise at least one of an out of sync indication related to a number of bad frames, an in sync indication related to a number of good frames, a time period, a path loss threshold and signal to noise (SINR) ratio threshold.

5. The method of claim 1, wherein the one or more mode switching parameters comprise at least one of a threshold number of random access channel (RACH) requests, a time period following and unsuccessful RACH attempt, a time period following a status report (SR) a buffer status report (BSR) or a resource request, or an indication of a handover failure or an incomplete handover.

6. The method of claim 1, wherein the one or more mode switching parameters are received from a system information broadcast.

7. The method of claim 1, wherein the one or more mode switching parameters comprise a time period and at least one additional mode switching parameter; and
wherein determining that the one or more mode switching parameters have been satisfied comprises determining that the at least one additional mode switching parameter has been satisfied and waiting until the time period has elapsed before switching to a second D2D mode.

8. The method of claim 1, further comprising:
sending a mode switching request to the base station.

9. The method of claim 8, wherein the one or more mode switching parameters comprise an indication from a user application and the mode switching request comprises a user initiated mode switch indication.

10. The method of claim 8, further comprising:
receiving a response from the base station indicating that a mode switch is allowed.

11. The method of claim 8, wherein the switching to a second D2D mode is performed autonomously prior to receiving a response from the base station.

12. The method of claim 1, wherein the one or more mode switching parameters comprise a modified RLF threshold.

13. The method of claim 12, wherein the modified RLF threshold is configured to be satisfied prior to reaching an unmodified RLF threshold.

14. The method of claim 1, further comprising:
storing a mode switch information log comprising one or more of a time stamp, a UE location, a radio interface condition, a UE velocity, a cell ID, and a carrier frequency.

15. The method of claim 1, further comprising:
maintaining a media access control (MAC) or a radio link control (RLC) configuration after switching to the second D2D mode.

16. The method of claim 1, further comprising:
reconfiguring a media access control (MAC) or a radio link control (RLC) configuration according to a predetermined state after switching to the second D2D mode.

17. The method of claim 1, further comprising:
continuing communications based on distributed transmission scheduling until one or more hysteresis parameters are met.

18. The method of claim 17, wherein the one or more hysteresis parameters include at least one of a time period, a path loss parameter, a number of good frames, and a signal to noise ratio (SINR).

19. The method of claim 1, further comprising:
resetting a protocol layer configuration, the resetting based at least in part on the switching.

20. The method of claim 1, further comprising:
utilizing the pool of resources associated with the second D2D mode until a connection is established with the base station; and
establishing the connection with the base station.

21. The method of claim 20, further comprising:
switching to the first D2D mode, the first D2D mode based at least in part on the centralized transmission resource schedule received from the base station.

22. An apparatus for device to device (D2D) wireless communication at a user equipment (UE), comprising:
a processor;
memory in electronic communication with the processor; and
instructions stored in the memory, the instructions being executable by the processor to:
receive a connection response message from a base station comprising one or more mode switching parameters, the one or more switching parameters relating to an indication of an imminent radio link failure (RLF) with the base station;
establish communications with one or more other UEs according to a first D2D mode, the first D2D mode based at least in part on a centralized transmission resource schedule received from the base station;
determine that the one or more mode switching parameters have been satisfied, wherein the one or more mode switching parameters comprise an indication from a user application;
sending a mode switching request to the base station, wherein the mode switching request comprises a user initiated mode switch indication; and
switch to a second D2D mode before the RLF occurs, the second D2D mode based at least in part on a distributed transmission scheduling using a pool of resources allocated by the base station.

23. The apparatus of claim 22, wherein the instructions are further executable by the processor to:
monitor communications from the base station for an indication of the pool of resources;
determine that a message from the base station indicating the pool of resources is not receivable; and
switch to a third D2D mode, the third D2D mode being based on distributed transmission utilizing a preconfigured resource pool.

24. The apparatus of claim 22, wherein the instructions are further executable by the processor to:
send a connection setup request to the base station, the connection setup request comprising a D2D mode indication.

25. An apparatus for device to device (D2D) wireless communication at a user equipment (UE), comprising:
a processor;
memory in electronic communication with the processor; and
instructions stored in the memory, the instructions being executable by the processor to:
receive a connection response message from a base station comprising one or more mode switching parameters, the one or more switching parameters relating to an indication of an imminent radio link failure (RLF) with the base station;
establish communications with one or more other UEs according to a first D2D mode, the first D2D mode based at least in part on a centralized transmission resource schedule received from the base station;
determine that the one or more mode switching parameters have been satisfied;
switch to a second D2D mode before the RLF occurs, the second D2D mode based at least in part on a distributed transmission scheduling using a first indication of a pool of resources allocated by the base station;
monitor communications from the base station for a second indication of the pool of resources;
determine that a message from the base station indicating the pool of resources is not receivable; and
switch to a third D2D mode, the third D2D mode being based on distributed transmission utilizing a preconfigured resource pool.

26. A method of device to device (D2D) wireless communication, comprising:
establishing communications with one or more other UEs according to a first D2D mode, the first D2D mode based at least in part on a preconfigured pool of transmission resources;
receiving system information from a base station allocating a pool of resources for transmission;
sending a mode switching request to the base station, wherein the mode switching request comprises a user initiated mode switch indication;
switching to a second D2D mode based at least in part on one or more mode switching parameters, the second D2D mode being based on distributed transmission scheduling using the pool of resources allocated by the base station;
modifying the one or more mode switching parameters, wherein the one or more mode switching parameters comprise an indication from a user application; and
continuing communications based on the distributed transmission scheduling until the one or more modified switching parameters are met.

27. The method of claim 26, further comprising:
establishing a connected state with the base station; and
switching to a third D2D mode, the third D2D mode based at least in part on a centralized transmission resource schedule received from the base station subsequent to establishing the connected state.

28. The apparatus of claim 25, wherein the instructions are further executable to:
send a connection setup request to the base station, the connection setup request comprising a D2D mode indication.

29. The apparatus of claim 25, wherein the instructions are further executable to:
maintain a media access control (MAC) or a radio link control (RLC) configuration after switching to the second D2D mode.

30. The apparatus of claim 25, wherein the instructions are further executable to:
continue communications based on distributed transmission scheduling until one or more hysteresis parameters are met.

* * * * *